Oct. 24, 1939. H. L. WHITTEMORE 2,177,605
GAUGE
Filed May 14, 1938 2 Sheets-Sheet 1
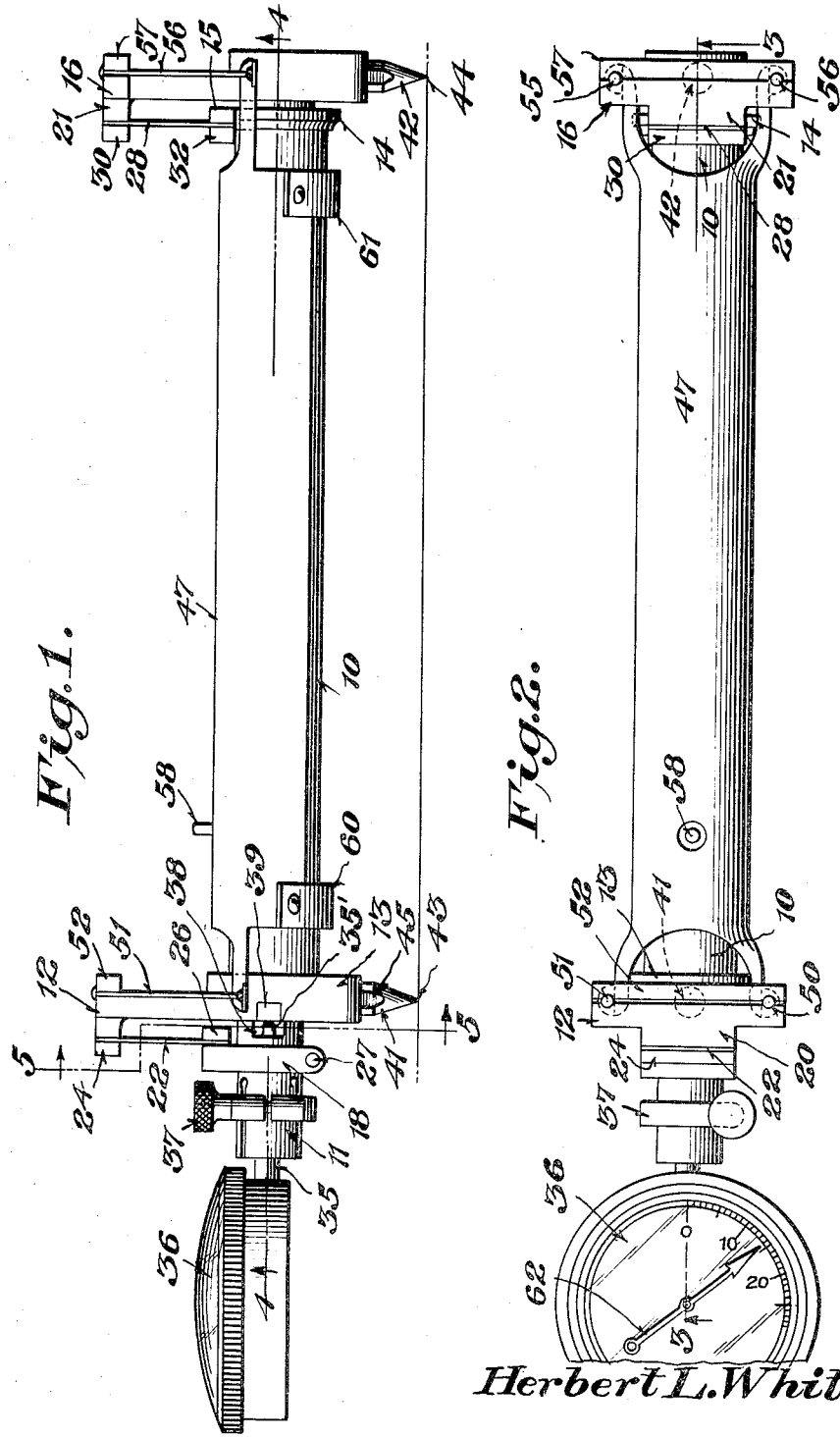
Inventor
Herbert L. Whittemore,
By Andrew T. Dupont
his Attorney

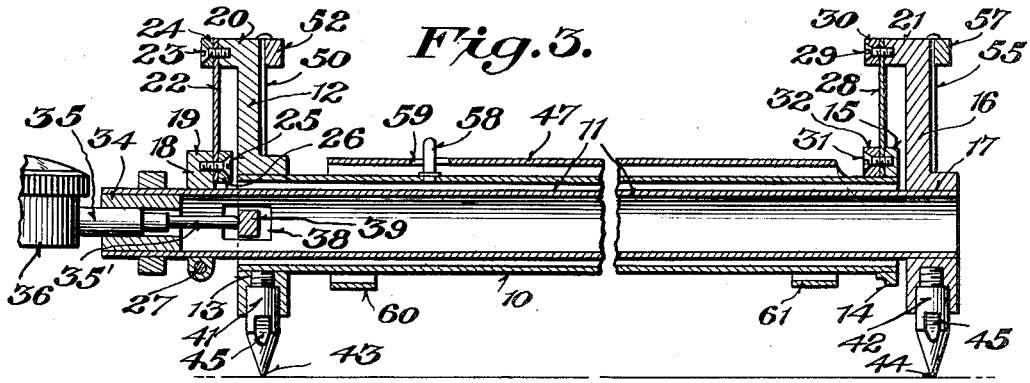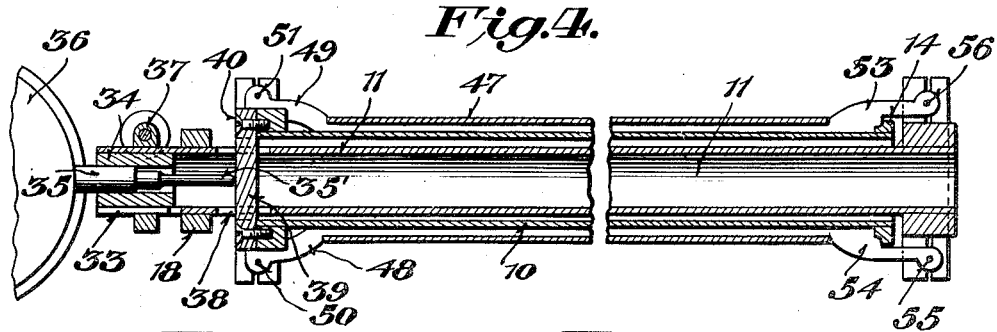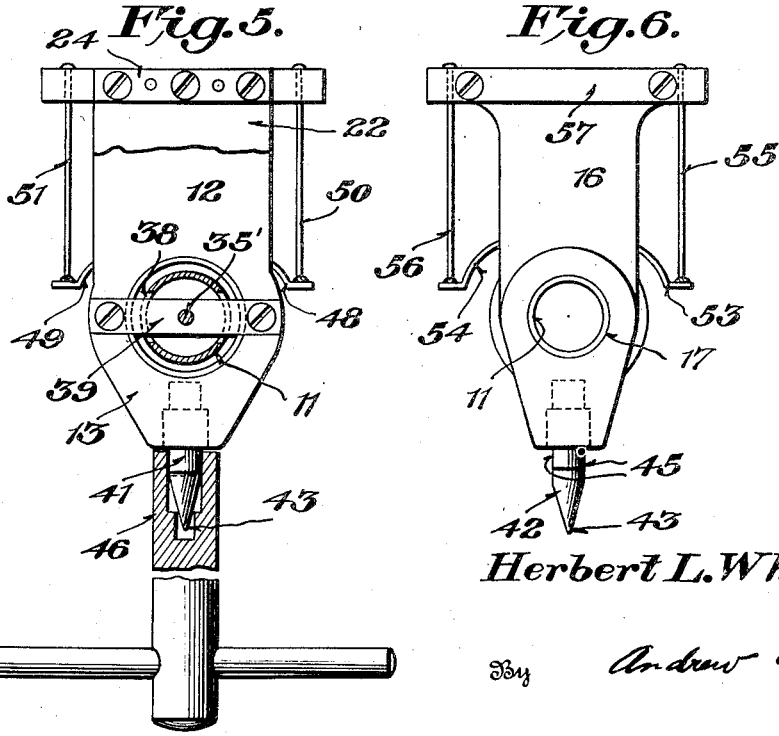

Patented Oct. 24, 1939

2,177,605

UNITED STATES PATENT OFFICE 2,177,605

GAUGE

Herbert L. Whittemore, Washington, D. C.

Application May 14, 1938, Serial No. 207,999

15 Claims. (Cl. 33—147)

My invention relates to a gauge for measuring the elongation or contraction of an arbitrary gauge-length on the surface of a structural member, such as a wall, test specimen, column or beam, and thereby measuring indirectly the stress in the said member.

The gauge may also be used to determine the increase or decrease of any arbitrary predetermined length without necessarily measuring stress in the element being investigated.

An object of my invention is to provide a portable gauge, which may be used to measure minute changes in a gauge-length.

A further object of my invention is to so design a gauge as to minimize, if not completely eliminate, inaccuracies in gauge readings due to handling of the instrument.

Another object of my invention is to provide a simple, rugged and accurate gauge, and in which readings may be easily and quickly obtained.

Other objects and features of my invention will be more fully understood from the following description, in connection with the accompanying drawings illustrating a form of my invention, and in which:

Figure 1 is a side elevation of the gauge;

Figure 2 is a plan view thereof;

Figure 3 is a sectional elevation along line 3—3 of Figure 1;

Figure 4 is a section along line 4—4 of Figure 1;

Figure 5 is a front elevation looking from the left end of the instrument in Figure 1; and, Figure 6 is a rear elevation looking from the right end in Figure 1.

My gauge consists essentially of an outer tube 10 within which a tube 11 of smaller diameter telescopes. The clearance between these tubes is ample and provides for unimpeded relative movement between the said tubes. A flange 12 having an opening 13 therein of a diameter substantially equal to the outer diameter of the tube 10 is permanently secured by any suitable means at the left hand extremity of tube 10. The right hand end of tube 10 has a collar 14 secured thereto having an upstanding flange portion 15, whose purpose will be explained later.

The inner tube 11 is provided at its right extremity with a flange 16 similar to and parallel with flange 12. Flange 16 has an opening 17 therein of a diameter substantially equal to the outer diameter of tube 11. The left hand end of tube 11 has a collar 18 secured thereto having an upstanding flange portion 19, whose function will be explained later.

Flange 12 has a flat shelf 20 at its upper end and a similar shelf 21 is provided at the upper end of flange 16. A flexible plate 22 is detachably secured at one end to the shelf 20, as shown in Figure 3, such as by means of screws 23 and retaining strip 24. The lower end of plate 22 is detachably secured to the flange portion 19 on collar 18 by means of the screws 25 and retaining strip 26.

For the ease of the assembly of the parts, it will be noted that the collar 18 is split, rigidity being assured by means of the screw 27, which is threaded into the split portions of the ring.

A second flexible plate 28 is detachably secured at its upper end to the shelf 21, such as, by means of screws 29 and retaining strip 30. The lower end of plate 28 is detachably secured to the flange portion 15 on collar 14 by means of the screws 31 and retaining strip 32.

The left end of tube 11 is split, as at 33, and a hollow bushing 34 is inserted therein for the purpose of receiving the sleeve 35 of a dial micrometer of a common type 36, the usual micrometer spindle 35' is slidably carried within sleeve 35. The sleeve 35 of the micrometer is made fast within the end of tube 11 by means of a split clamp 37 riding on the said tube. Any other suitable means may be used for the purpose of securing the micrometer to the inner tube 11. For instance, a dial micrometer having an integral sleeve 35 with an outer diameter substantially equal to the inner diameter of tube 11 may be employed, in which case the sleeve will be directly fitted in the end of tube 11, held in place therein by means of clamp 37 and bushing 34 will be unnecessary.

Tube 11 is provided with a through slot 38 of a length slightly greater than the maximum relative displacement of tubes 10 and 11 when the gauge is in use, and a stop or abutment bar 39 is provided and is secured to the flange 12 of tube 10 by means of screws to straddle the opening or slot 38 and is so located that the spindle 35' pushes against the said bar 39 to actuate the indicating element of dial micrometer 36.

Pins 41 and 42 are threaded into the lower portions of the respective flanges 12 and 16 carried by the respective tubes 10 and 11, and each of these pins is provided with a point 43, 44, adapted to be inserted in suitable gauge holes when the instrument is being used.

In order to afford easy screwing and unscrewing of the pins 41 and 42, each is provided with opposite flat face portions 45 adapted to be received within the forked end of a special wrench 46, Figure 5, whereby each pin may be easily driven home or removed.

For the purpose of providing suitable means for carrying and operating the instrument, a handle member 47 is mounted on the device. This handle consists of a semicircular shroud or shell bent about and spaced from the outer tube 10 and extending between the flanges 12 and 16. Fork like extensions 48, 49 connect the left end of the handle to the shelf 20 on flange 12 by means of flexible rods or wires 50 and 51. These wires are connected by any suitable means to the extensions 48, 49 of the handle, and are secured at the opposite ends of the shelf 20 by means of screws and retaining strip 52.

Corresponding fork like extensions 53, 54 connect the right end of the handle to the shelf 21 on flange 16 by means of flexible rods or wires 55, 56, similar to 50, 51. These wires are also connected to the handle extensions 53, 54, and they are secured to the shelf 21 by means of a screwed retaining strip 57. It will be evident that instead of using wires, such as 50, 51, 55, 56, the handle 47 may be connected to the respective flanges 12 and 16 by means of flexible or spring plates similar to flexible plates 22 and 28.

One of the main features of my invention lies in the fact that the plane passing through wires 50 and 51 intersects point 43 of pin 41, while the plane passing through wires 55, 56 intersects point 44. In this manner, when the gauge is in use, any pressure applied to the handle 47 by the hand of the operator is exerted through the above defined planes and serves to maintain the points 43 and 44 more firmly in the gauge holes. Furthermore, any side sway of the handle 47 will be absorbed by the wires 50, 51, 55 and 56, due to the peculiar suspension of the handle described, and will not disturb the points 43, 44. In this manner, a common source of error with existing strain gauges will be avoided.

In order to limit the swaying movement of the handle 47 about its flexible suspension, a pin 58 is removably secured to the outer tube 10, this pin extending through a suitable opening 59 in the handle or shell 47. An additional function of pin 59 consists in indicating that the instrument is properly held to the work when it occupies a central position in the opening 59. Conversely, if the pin is to one side of the center of the opening, it indicates that improper pressure is put on the handle in holding the gauge to the work. Pin 58, therefore, acts as a centering means. The handle may assume any desirable shape and may be made of any adequate material. In the instant case, the handle assumes the form of a semicircular shell so that when the operator takes a hold of the device his fingers may reach the outer wall of tube 11 and, in this way, assist in locating the points 43 and 44 in the gauge holes.

If desired, bails 60 and 61 may be detachably secured at spaced points on the handle 47. These bails, by completing the encirclement of the outer tube 10 at these points, afford a guiding means for the tube within the handle. In addition thereto, when the instrument is lifted up, the bails 60, 61, by coming up to rest against tube 10, remove the stress from wires 50, 51, 55 and 56, preventing crippling thereof. It will be obvious to one skilled in the art that this same function may be fulfilled by tubes placed about each of the wires.

The stress in structural members varies from place to place in accordance with the load carried by the said members. Since most structural materials approximately follow Hooke's law when subjected to external forces, the change in stress at any place on the surface of the member may be measured by observing the change in a gauge length at that place. The reading of the gauge is recorded when there is no load on the member, then after each load is applied. In practice, a great many gauge lines are laid on the structure, then the gauge is used to read the gauge lengths one after the other for each succeeding load, carrying the same gauge from one point to the next.

In use, the pin points 43, 44 of the gauge are inserted into the gauge holes and held in position by the operator, who presses slightly on the handle 47. The relative movement of points 43, 44 is transmitted through the respective tubes 10 and 11, respective flanges 12 and 16, respective flexible plates 22 and 28 and associated collars 15 and 18, to the spindle 35' of the micrometer 36, which spindle is pressing against abutment bar 39 carried by tube 11, as explained above. Thus, the relative movement of the tubes 10 and 11, which is equal to the relative movement of the pin points 43 and 44, is indicated on the dial of the dial micrometer 36 by the pointer 62. The change in the length of any gauge line on the member may, therefore, be obtained.

Due to the arrangement of the thin flexible plates 22 and 28, as shown, and due to the suspension of the handle 47 on the wires 50, 51, 55 and 56 on the flanges 12 and 16, no compressive force is transmitted to the said plates and no disturbance is transmitted to the pin points 43 and 44 due to handling the instrument.

The mounting of dial micrometer 36, as illustrated, permits it to be turned in the bushing 34 into any position which the nature of the work may require by merely releasing the clamp 37.

It has been found, in practice, that my new and improved gauge affords very accurate readings and that, since it eliminates the errors due to handling in prior art gauges, no preliminary training is needed for the use thereof.

In order to minimize errors, which would creep in the readings of the dial micrometer 36 due to temperature changes, the inner tube 11 is made of a metal alloy having a low coefficient of expansion due to temperature changes. This alloy is preferably "Invar". Due to the connection of the micrometer body with tube 11 and of spindle 35' with tube 10, when the dial moves in one direction due to expansion or contraction caused by temperature changes, the spindle 35' moves in the opposite direction so that the reading differentials remain the same.

I claim:

1. In a gauge, a pair of nested tubes each having work engaging portions, connecting means between said tubes, means for measuring relative displacement between said tubes, and a handle connected to both of said tubes in proximity to the work engaging portions.

2. In a gauge, a pair of nested tubes each having work engaging portions, flexible connections between said tubes, means for measuring relative displacement between said tubes, and a handle connected to both of said tubes in proximity to the work engaging portions.

3. In a gauge, a pair of nested tubes each having work engaging portions, connecting means between said tubes, means for measuring relative displacement between said tubes, a handle, and flexible connections between said handle and each of said tubes in proximity to the work engaging portions.

4. In a gauge, a pair of nested tubes each having work engaging portions, flexible connections between said tubes, means for measuring relative displacement between said tubes, a handle, and flexible connections between said handle and each of said tubes in proximity to the work engaging portions.

5. In a gauge, a pair of nested tubes each having work engaging portions, flexible connections between said tubes, means for measuring relative displacement between said tubes, said means comprising an indicator carried by one of said tubes and an element movable with the other of said tubes, and a handle connected to both of said tubes in proximity to the work engaging portions.

6. In a gauge, a pair of relatively slidable concentric tubes each having work engaging portions, flexible connections between said tubes, means for measuring relative displacement between said tubes, said means comprising an indicator carried by one of said tubes and an element movable with the other of said tubes, a handle, and flexible connections between said handle and each of said tubes in proximity to the work engaging portions.

7. In a gauge, a pair of relatively slidable concentric tubes, means for measuring relative displacement between said tubes, a handle, flexible connections between said handle and each of said tubes, and a pin on each of said tubes for engaging the member to be tested, corresponding flexible connections and pin being contained in the same plane.

8. In a gauge, a pair of relatively slidable concentric tubes, flexible means between said tubes, means for measuring relative displacement between said tubes, a handle, flexible connections between one end of the handle and one of said tubes, flexible connections between the other end of the handle and the other of said tubes, and a pin on each of said tubes for engaging the member to be tested, the flexible connections at one end of the handle and its corresponding pin being contained in the same plane, and the flexible connections at the other end of the handle and its corresponding pin being contained in the same plane.

9. In a gauge, a pair of relatively slidable concentric tubes, flexible connections between said tubes, means for measuring relative displacement between said tubes, said means comprising an indicator carried by one of said tubes and an element movable with the other of said tubes, a handle, flexible connections between said handle and each of said tubes, and a pin on each of said tubes for engaging the member to be tested, corresponding flexible connections and pin being contained in the same plane.

10. In a gauge, a pair of relatively slidable concentric tubes, flexible connections between said tubes, means for measuring relative displacement between said tubes, said means comprising an indicator carried by one of said tubes and an element movable with the other of said tubes, a handle, flexible connections between one end of the handle and one of said tubes, flexible connections between the other end of the handle and the other of said tubes, and a pin on each of said tubes for engaging the member to be tested, the flexible connections at one end of the handle and its corresponding pin being contained in the same plane, and the flexible connections at the other end of the handle and its corresponding pin being contained in the same plane.

11. In a gauge, a pair of nested tubes each having work engaging portions, connecting means between said tubes, means for measuring relative displacement between said tubes, a handle connected to both of said tubes in proximity to the work engaging portions, and centering means for determining the normal position of said handle with respect to the longitudinal axis of said tubes, said centering means including an element carried by one of said tubes.

12. In a gauge, a pair of nested tubes each having work engaging portions, connecting means between said tubes, means for measuring relative displacement between said tubes, a handle connected to said tubes in proximity to the work engaging portions, said handle having an opening therein, and a pin carried by one of said tubes and extending through said opening, said pin and opening cooperating to determine the normal position of said handle with respect to the longitudinal axis of said tubes.

13. In a gauge, a pair of nested tubes; flexible connecting means between said tubes, one of said tubes having a lateral opening therethrough, an element carried by the other of said tubes and extending through the said opening, and means for measuring relative displacement between said tubes, said means comprising a member movable with the aforementioned element and another member movable with one of said tubes.

14. In a gauge, a pair of concentric tubes, flexible connecting means between each of the proximate ends of said tubes, a pin on each of said tubes for engaging the member to be tested, and means for measuring relative displacement between said tubes, said means comprising an indicator carried by one of said tubes, a stem for said indicator operatively connected to the other of said tubes, the axis of said stem coinciding with the common longitudinal axis of said tubes.

15. In a gauge, a pair of concentric tubes each having work engaging portions, connecting means between each of the proximate ends of said tubes, means for measuring relative displacement between said tubes, said means comprising an indicator carried by one of said tubes, a stem for said indicator operatively connected to the other of said tubes, the axis of said stem coinciding with the common longitudinal axis of said tubes, and a handle connected to both of said tubes in proximity to the work engaging portions.

HERBERT L. WHITTEMORE.